US010454620B2

(12) United States Patent
Nammi et al.

(10) Patent No.: US 10,454,620 B2
(45) Date of Patent: Oct. 22, 2019

(54) FACILITATING NOTIFICATIONS TO INDICATE FAILED CODE BLOCK GROUPS IN 5G OR OTHER NEXT GENERATION NETWORKS

(71) Applicant: AT&T Intellectual Property I, L.P., Atlanta, GA (US)

(72) Inventors: SaiRamesh Nammi, Austin, TX (US); Arunabha Ghosh, Austin, TX (US); Ralf Bendlin, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 95 days.

(21) Appl. No.: 15/625,751

(22) Filed: Jun. 16, 2017

(65) Prior Publication Data

US 2018/0367253 A1 Dec. 20, 2018

(51) Int. Cl.
*H04L 1/08* (2006.01)
*H04L 1/18* (2006.01)
*H04L 1/16* (2006.01)

(52) U.S. Cl.
CPC .............. *H04L 1/08* (2013.01); *H04L 1/1607* (2013.01); *H04L 1/1621* (2013.01); *H04L 1/1809* (2013.01); *H04L 1/1812* (2013.01); *H04L 1/1896* (2013.01); *H04L 1/1614* (2013.01)

(58) Field of Classification Search
CPC ........ H04L 1/08; H04L 1/1607; H04L 1/1812
See application file for complete search history.

(56) References Cited

U.S. PATENT DOCUMENTS

| | | | |
|---|---|---|---|
| 5,291,479 | A | 3/1994 | Vaziri et al. |
| 6,771,978 | B1 | 8/2004 | Kayama et al. |
| 6,892,341 | B2 | 5/2005 | Golitschek et al. |
| 7,003,709 | B2 | 2/2006 | Wengerter et al. |
| 7,295,624 | B2 | 11/2007 | Onggosanusi et al. |

(Continued)

FOREIGN PATENT DOCUMENTS

EP 2885889 A2 6/2015

OTHER PUBLICATIONS

Khosravirad et al., "Flexible Multi-Bit Feedback Design for HARQ Operation of Large-Size Data Packets in 5G," IEEE Proceedings of VTC, Jun. 2017, 6 pages.

Schuba et al., "An Analysis of Retransmission Strategies for Reliable Multicast Protocols," Performance of Information and Communication Systems, 1998, pp. 125-136, Chapman & Hall, 12 pages.

(Continued)

*Primary Examiner* — Kyle Vallecillo
(74) *Attorney, Agent, or Firm* — Amin, Turocy & Watson, LLP

(57) ABSTRACT

Facilitating notifications to indicate failed code block groups is provided herein. A method can comprise determining a value of a confirmation bit received in a transmission based on a first determination that a new data indicator is set to a null indication and performing an action from a group of actions. The group of actions can comprise decoding a first group of code block groups of the code block groups based on a second determination that the value of the confirmation bit for the first group of code block groups is a first value. The group of actions can also comprise decoding the code block groups based on a third determination that the value of the confirmation bit for the code block groups is set to a second value and sending a report indicating at least one of the code block groups for which the transmission failed.

19 Claims, 14 Drawing Sheets

(56) References Cited

U.S. PATENT DOCUMENTS

| | | | | |
|---|---|---|---|---|
| 7,471,740 | B2 | 12/2008 | Von et al. | |
| 8,102,805 | B2 | 1/2012 | Goransson et al. | |
| 8,320,486 | B2 | 11/2012 | Kotecha | |
| 8,514,959 | B2 | 8/2013 | Yu et al. | |
| 8,539,298 | B2 | 9/2013 | Shimanuki et al. | |
| 8,631,296 | B2 | 1/2014 | Xue et al. | |
| 8,954,814 | B2 | 2/2015 | Mayrench et al. | |
| 9,032,267 | B2 | 5/2015 | Shimanuki et al. | |
| 9,185,722 | B2 | 11/2015 | Larmo et al. | |
| 9,236,918 | B2 | 1/2016 | Toda et al. | |
| 9,282,570 | B2 | 3/2016 | Xia et al. | |
| 9,294,959 | B2 | 3/2016 | Seyama et al. | |
| 2009/0028263 | A1 | 1/2009 | Yu et al. | |
| 2009/0313516 | A1 | 12/2009 | Shin et al. | |
| 2012/0282956 | A1 | 11/2012 | Kim et al. | |
| 2016/0036468 | A1 | 2/2016 | Eckert et al. | |
| 2016/0226643 | A1 | 8/2016 | Mallik et al. | |
| 2016/0285589 | A1 | 9/2016 | Mukkavilli et al. | |
| 2018/0145797 | A1* | 5/2018 | Yeo | H04L 1/1812 |
| 2018/0270022 | A1* | 9/2018 | Sun | H04L 1/1893 |
| 2018/0278368 | A1* | 9/2018 | Kim | H04L 1/1829 |
| 2018/0287752 | A1* | 10/2018 | Park | H04L 5/0044 |
| 2018/0368110 | A1* | 12/2018 | Ying | H04W 72/04 |

OTHER PUBLICATIONS

Schuba et al., “Performance Evaluation of Multicast Communication in Packet-Switched Networks,” Performance Evaluation, 2000, vol. 39, Issue 1, 27 pages.

Lin et al., “Uplink Contention Based Multiple Access for 5G Cellular IoT,” Vehicular Technology Conference (VTC), 2015, IEEE, 5 pages.

Au et al., “Uplink Contention Based SCMA for 5G Radio Access,” Globecom Workshops (GC Wkshps), 2014, IEEE, 6 pages.

International Search Report and Written Opinion for International Application No. PCT/US2018/032456 dated Aug. 6, 2018, 13 pages.

LG Electronics, “Consideration on CB group based HARO operation,” 3GPP TSG RAN WG1 Meeting #89, May 2017, R1-1707661, Hangzhou, P.R. China, 5 pages.

Lenovo et al., “HARQ-ACK feedback for CBG-based retransmission,” 3GPP TSG RAN WG1 Meeting #89, May 2017, R1-1707768, Hangzhou, P.R. China, 5 pages.

Sony, “Discussion on the CBG-based retransmission,” 3GPP TSG RAN WG1 NR Meeting #89, May 2017, R1-1708254, Hangzhou, P.R. China, 3 pages.

Ericsson, “Impact from multi-bit HARQ,” 3GPP TSG-RAN WG2 #98, May 2017, Tdoc R2-1704408, Hangzhou, P.R. of China, 4 pages.

* cited by examiner

FACILITATING NOTIFICATIONS TO INDICATE FAILED CODE BLOCK GROUPS IN 5G OR OTHER NEXT GENERATION NETWORKS

TECHNICAL FIELD

The subject disclosure relates generally to communications systems, and for example, to facilitating notifications to indicate failed code block groups in 5G or other next generation networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
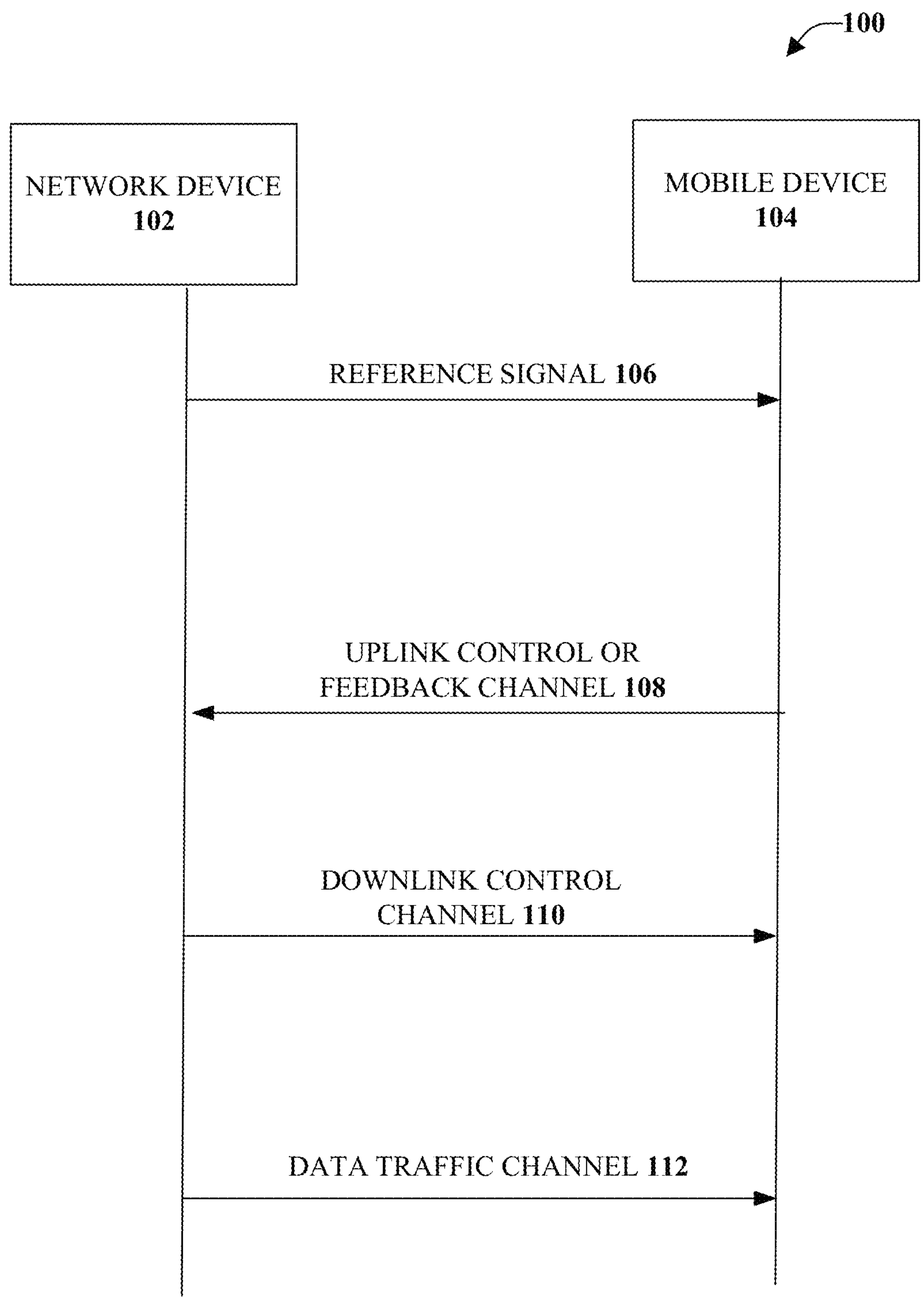
FIG. 1 illustrates an example, non-limiting message sequence flow chart that can facilitate downlink data transfer in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that relate to facilitating notifications to indicate failed code block groups in 5G or other next generation networks. For example, the various aspects are related to communication systems with hybrid automatic repeat requests (HARQs). In further detail, the various aspects are related to control channel transmission with code block group transmission for 5G wireless systems. As discussed herein, rather than explicitly indicating which Code Block Groups (CBGs) are re-transmitted, the network can indicate through implicit signaling by one bit (or a single bit), referred to herein a CBG confirmation bit (or CBG confirmation data). When the CBG confirmation bit is set to one ("1"), the User Equipment (UE) can be configured to determine that the network re-transmitted the same CBGs, which were reported as Negative AcKnowledgement (NAK) by the UE for the previous DownLink (DL) transmission for the same HARQ process identifier.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, “5G” can also be referred to as New Radio (NR) access. Accordingly, systems, methods, and/or machine-readable storage media for facilitating management of group common downlink control channels for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In one embodiment, described herein is a method that can comprise setting, by a network device of a wireless network, the network device comprising a processor, a one bit of information in a data stream to a defined value based on a receipt of a negative acknowledgement, from a mobile device, for a code block group after a first transmission of the code block group. The method can also comprise facilitating, by the network device, a second transmission of the data stream via a control channel. The data stream can comprise the one bit of information and the code block group. The one bit of information that is set to the defined value can indicate the code block group is being re-transmitted in the second transmission for a decoding at the mobile device.

In an example, the method can comprise facilitating the second transmission using implicit signaling to indicate the defined value of the one bit of information. According to an implementation, facilitating the second transmission can comprise facilitating the transmitting of the code block group using a hybrid automatic repeat request process identifier that was used for the first transmission.

In another example, the one bit of information can be a first one bit of information, the data stream can be a first data stream, the defined value can be a first defined value, and the code block group can be a first code block group. Further to this example, the method can comprise setting, by the network device, a second one bit of information in a second data stream to a second defined value based on a determination that a second code block group is to be transmitted to the mobile device. The method can also comprise facilitating, by the network device, a third transmission comprising the second data stream via the control channel. The second data stream can comprise the second one bit of information and the second code block group. The second defined value can indicate code block groups in the second code block group are to be decoded at the mobile device. Further to this example, the second code block group was not previously transmitted to the mobile device. In an example, the first defined value can be a value of one and the second defined value can be a value of zero. In another example, facilitating the third transmission can comprise facilitating the third transmission using a hybrid automatic repeat request at a transport block level.

In an example, the method can comprise configuring, by the network device, the mobile device with information related to a number of code block groups for a codeword prior to the first transmission. Further, to this example, configuring the mobile device can comprise sending the information via a radio resource control layer. In another example, configuring the mobile device can comprise sending the information via a signaling layer that is higher than a radio resource control layer.

In another example, the method can comprise enabling, by the network device, a control block group based re-transmission through radio resource control signaling. In addition, setting of the one bit of information can comprise reducing a signaling overhead for a downlink control channel.

In accordance with an embodiment, another method can comprise determining, by a mobile device comprising a processor, a value of a confirmation data received in a transmission based on a first determination that a new data indicator is set to a null indication. The transmission can comprise code block groups sent via a control channel. Further, the method can comprise performing, by the mobile device, an action from a group of actions. The group of actions can comprise decoding a first group of code block groups of the code block groups based on a second determination that the value of the confirmation data for the first group of code block groups is a first value. The first group of code block groups can be code block groups that failed to be received by the mobile device during a previous transmission. A second group of code block groups of the code block groups that did not fail to be received by the mobile device during the previous transmission are not decoded. The group of actions can also comprise decoding the code block groups based on a third determination that the value of the confirmation data for the code block groups is set to a second value and sending a report indicating at least one of the code block groups for which the transmission failed. The control channel can comprise a downlink control channel configured to operate according to a fifth generation wireless communication network protocol, according to an aspect.

In an example, determining the value of the confirmation data can comprise determining the code block groups are received as a re-transmission based on the confirmation data being the first value and determining the code block groups are a new transmission based on the confirmation data being the second value.

In another example, the method can comprise receiving a configuration information that comprises information related to a quantity of code block groups for a codeword prior to receipt of the transmission. Further to this example, receiving the configuration information can comprise receiving the configuration information via a radio resource control layer. Alternatively, receiving the configuration information can comprise receiving the configuration information via a signaling layer that is higher than a radio resource control layer.

According to yet another embodiment, described herein is a machine-readable storage medium comprising executable instructions that, when executed by a processor, facilitate performance of operations. The operations can comprise determining a value of at least one bit received in a downlink transmission based on a first determination that a new data indicator is set to a null indication. The downlink transmission can comprise code block groups sent via a control channel. The operations can also comprise, in response to a second determination indicating that the value of the at least one bit for the first code block groups is a first value, decoding first code block groups of the code block groups. The first code block groups can be code block groups that failed during a previous transmission, and wherein second code block groups that did not fail to be received by the mobile device during the previous transmission are not decoded. Alternatively or additionally, the operations can comprise, in response to the second determination indicating that the value of the at least one bit for the first code block groups is not the first value, decoding the code block groups based on a third determination that the value of the at least one bit for the code block groups is set to a second value. Further, the operations can comprise sending a report indicating at least one of the code block groups for which the transmission failed. According to an aspect, the control channel can comprise a downlink control channel configured to operate according to a fifth generation wireless communication network protocol.

The various aspects provided herein can be applicable to both DownLink (DL), UpLink (UL), and SideLink (SL) data transmission protocols. In addition, the various aspects can be applicable to single carrier and multi carrier (carrier aggregation) transmission protocols.

Communication link-system performance can be enhanced with the use of forward error correction code. When forward error correction is applied to an information block, additional parity bits can be added to the information bits. These additional parity bits can protect the information bits when passed through a communication channel (e.g., Additive White Gaussian Noise (AWGN), multipath fading, and so on). Various forward error correction codes can be utilized and, based on the performance in additive white Gaussian channels (AWGN), 3GPP can use Low Density Parity Check (LDPC) codes as the channel coding protocol for encoding data channel in downlink and uplink direction. The LDPC codes are a class of linear block codes where the parity check matrix is sparse (low density of 1 s). When iterative decoding is applied at the receiver, these codes can perform close to Shannon capacity with less decoding complexity. Currently the IEEE 802.11x, family uses LDPC codes as the forward error correction code.

Referring initially to FIG. 1 illustrated is an example, non-limiting message sequence flow chart 100 that can facilitate downlink data transfer in accordance with one or more embodiments described herein. The non-limiting message sequence flow chart 100 can be utilized for new radio, as discussed herein. As illustrated, the non-limiting message sequence flow chart 100 represents the message sequence between a network device 102 and a mobile device 104. As used herein, the term "network device 102" can be interchangeable with (or include) a network, a network controller or any number of other network components. One or more pilot signals and/or reference signals 106 can be transmitted from the network device 102 to the mobile device 104. The one or more pilot signals and/or reference signals 106 can be beamformed or non-beamformed. Based on the one or more pilot signals and/or reference signals 106, the mobile device 104 can compute the channel estimates and can determine the one or more parameters needed for channel state information (CSI) reporting. The CSI report can comprise, for example, channel quality indicator (CQI), precoding matrix index (PMI), rank information (RI), the best subband indices, best beam indices etc., or any number of other types of information.

The CSI report can be sent from the mobile device 104 to the network device 102 via a feedback channel (e.g., uplink control or feedback channel 108). The network device 102, which can comprise a scheduler, can use the CSI report for choosing the parameters for scheduling of the particular mobile device 104. The network device 102 can send the scheduling parameters to the mobile device 104 in a downlink control channel (e.g., downlink control channel 110). After the scheduling parameter information is transmitted, the actual data transfer can take place from the network device 102 to the mobile device 104 over the data traffic channel 112.

The downlink control channel carries information about the scheduling grants. This can include a number of MIMO layers scheduled, transport block sizes, modulation for each codeword, parameters related to Hybrid Automatic Repeat Request (HARQ), sub band locations, and precoding matrix index corresponding to the sub bands.

Various information can be transmitted by means of the downlink control information (DCI) format. Such information can include: localized/distributed Virtual Resource Block (VRB) assignment flag, resource block assignment, modulation and coding protocol, HARQ process number, new data indicator, redundancy version, Transmission Power Control (TPC) command for uplink control channel, downlink assignment index, precoding matrix index, number of layers, transmitter beam information for data channel, Quasi Co-Location (QCL) condition, and/or Demodulation Reference Signal (DMRS) port information.

Figure 2:
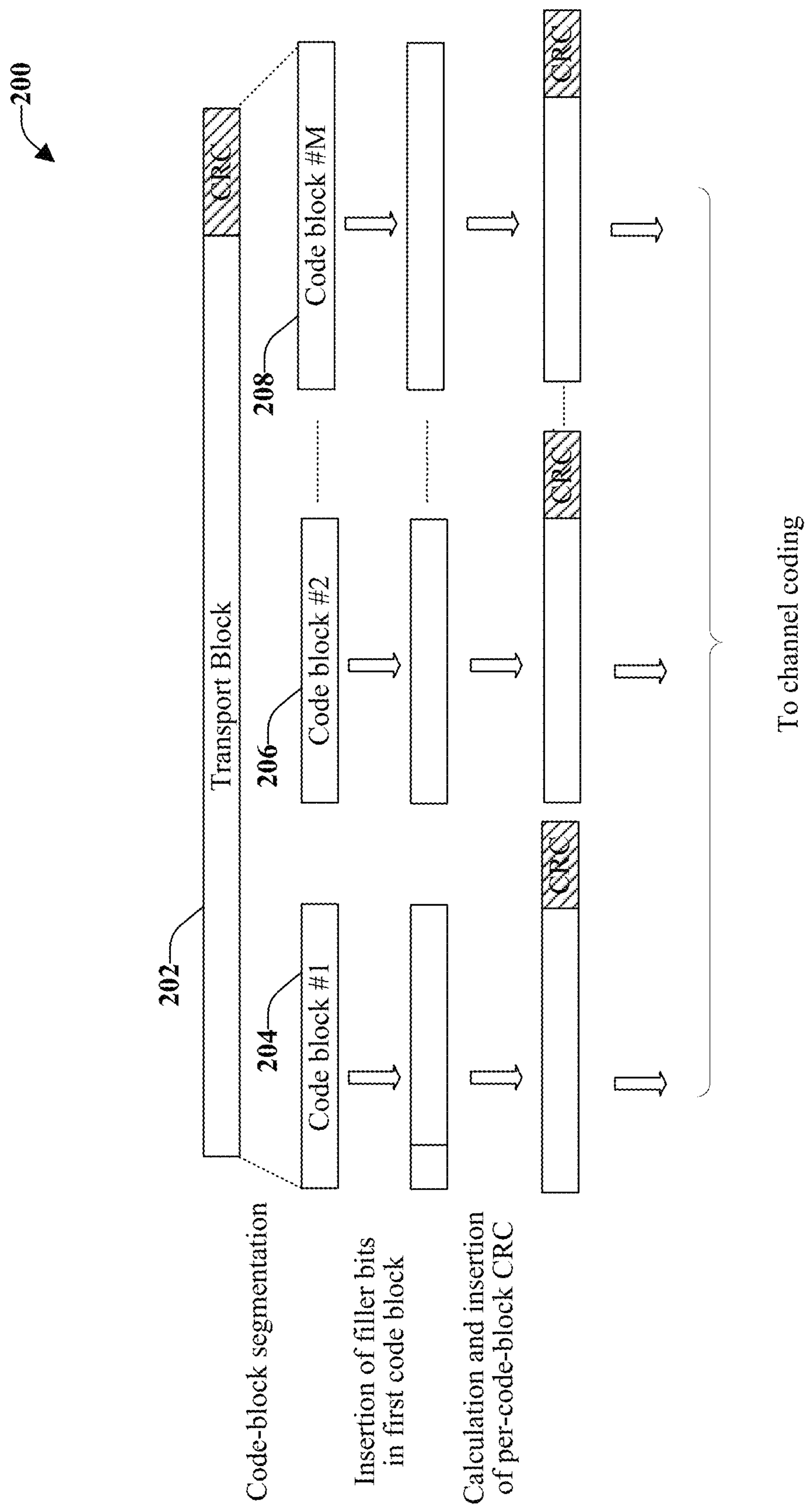
FIG. 2 illustrates an example, non-limiting, codeblock segmentation in accordance with one or more embodiments described herein.

FIG. 2 illustrates an example, non-limiting, codeblock segmentation 200 in accordance with one or more embodiments described herein. In NR, for data transmission, the transport block can be encoded using LDPC code. In the first step of the physical-layer processing, a M-bit CRC is calculated for and appended to each transport block. The CRC can allow for receiver-side detection of errors in the decoded transport block. The corresponding error indication can, for example, be used by the downlink hybrid-ARQ protocol as a trigger for requesting re-transmissions. If the transport block, including the transport-block CRC, exceeds the maximum code-block size (e.g., 8192), code-block segmentation can applied before the LDPC coding as shown in FIG. 2.

Code-block segmentation implies that the transport block 202 is segmented into smaller code blocks, illustrated as code block one 204, code block two 206, through code block M 208, where M is an integer. The sizes of the codes blocks can match the set of code-block sizes supported by the LDPC coder. In order to ensure that a transport block of arbitrary size can be segmented into code blocks that match the set of available code-block sizes, it is possible to insert "dummy" filler bits at the head of the first code block.

In the case of a single code block when no segmentation is needed, no additional code-block CRC is applied. Thus, code-block segmentation is only applied to large transport blocks for which the relative extra overhead due to the additional transport block CRC is small. Information about the transport-block size is provided to the terminal as part of the scheduling assignment transmitted on the Physical Downlink Control Channel (PDCCH). Based on this information, the terminal can determine the code-block size and number of code blocks. The terminal receiver can thus, based on the information provided in the scheduling assignment, straightforwardly undo or assemble the code-block segmentation and recover the decoded transport blocks.

It is noted that with code block segmentation, the transport block has a Cyclic Redundancy Check (CRC) and, further, the CRC is attached at the Control Block (CB) level. Thus, even though some of the CBs can be in error, only the receiver knows that the CBs are in error. Therefore, the transmitter cannot re-transmit the failed code blocks since there is no mechanism to convey the failed code blocks from the receiver to the transmitter. To solve this problem, 3GPP can include mechanisms to re-transmit the failed code blocks if the receiver communicates the failed codeblocks with a group referred to as a code block group. One technique is to group the code block segments (e.g., code block group) and send an HARQ ACK/NAK for these code block groups. Therefore, if any code block segments within the code blocks are in error, then the receiver informs the transmitter that the code block is in error. The transmitter then resends all the HARQ of all the code block segments within that code block group, which can result in very high signaling overhead.

In a code block group (CBG) re-transmission protocol, when the UE informs about the failed code block groups belonging to a specific HARQ process number via the uplink feedback channel In this case, the network needs to re-transmit those failed code block groups during the next transmission. If this approach for indicating the code block groups which are scheduled for re-transmission is utilized, the signaling overhead is very high.

For example, if the network configures the number of code block groups (N) for the highest number of resources elements, such as 6600. Then N=6600*8*14*4/8192=90.2344. Thus, the network can configure the N to be 90. Thus, for every re-transmission, the network needs to send a bit map of length equal to 90 bits in the downlink control channel. Where the bits positions corresponding to the failed code block groups are set to “1,” it indicates to the UE that those CBGs are re-transmitted. Thus with this method for indicating the CBG during re-transmissions, a large amount of overhead is utilized for the downlink control channel. This implies that the downlink control channel occupies more resources, thereby reducing the number of resources for data traffic channels. This in turn reduces the throughput and capacity for the network. The various aspects provided herein utilize a lower number of resources for downlink control channel and, at the same time, can exploit the benefits of the CBG based transmission.

According to the various aspects provided herein, a method to indicate the failed code block groups can be indicated with significantly reduced overhead while at the same time achieving the gains due to the CBG based transmission techniques. The disclosed aspects can provide reduced signaling overhead for downlink control channel, thereby efficiently allocating the resources for control channel. Further, the disclosed aspects can improve the link and system throughput. Additionally, the disclosed aspects can reduce latency since the success probability increases with the various aspects discussed herein.

As previously indicated, the various embodiments are applicable to both downlink, uplink, and side link data transmission protocols. In addition, the embodiments are applicable to single carrier and multi carrier (Carrier aggregation) transmission protocols.

A principle for the various aspects discussed herein is that for re-transmissions, rather than explicitly indicating which CBGs are re-transmitted in the downlink control channel, the network indicates through implicit signaling by a single bit, referred to herein as a CBG confirmation bit. According to some implementations, the implicit signaling can include at the one bit of information (e.g., at least one CBG confirmation bit). When the CBG confirmation bit is set to one (“1”), the UE determines that the network re-transmitted the same CBGs which were reported as NAK by the UE for the previous DL transmission for the same HARQ process identifier. When the CBG confirmation bit is set to zero (“0”), then the UE can determine that the network is not using CBG based re-transmission, but is using a HARQ process at the transport block level (e.g., without the CBG concept). Therefore, with the CBG confirmation bit discussed herein, overhead can be reduced significantly. It is noted that during the first transmission (e.g., when the new data indicator is equal to 1), the contents of the CBG confirmation bit is arbitrary since the CBG based transmission is meaningless for the first transmission.

Figure 3:
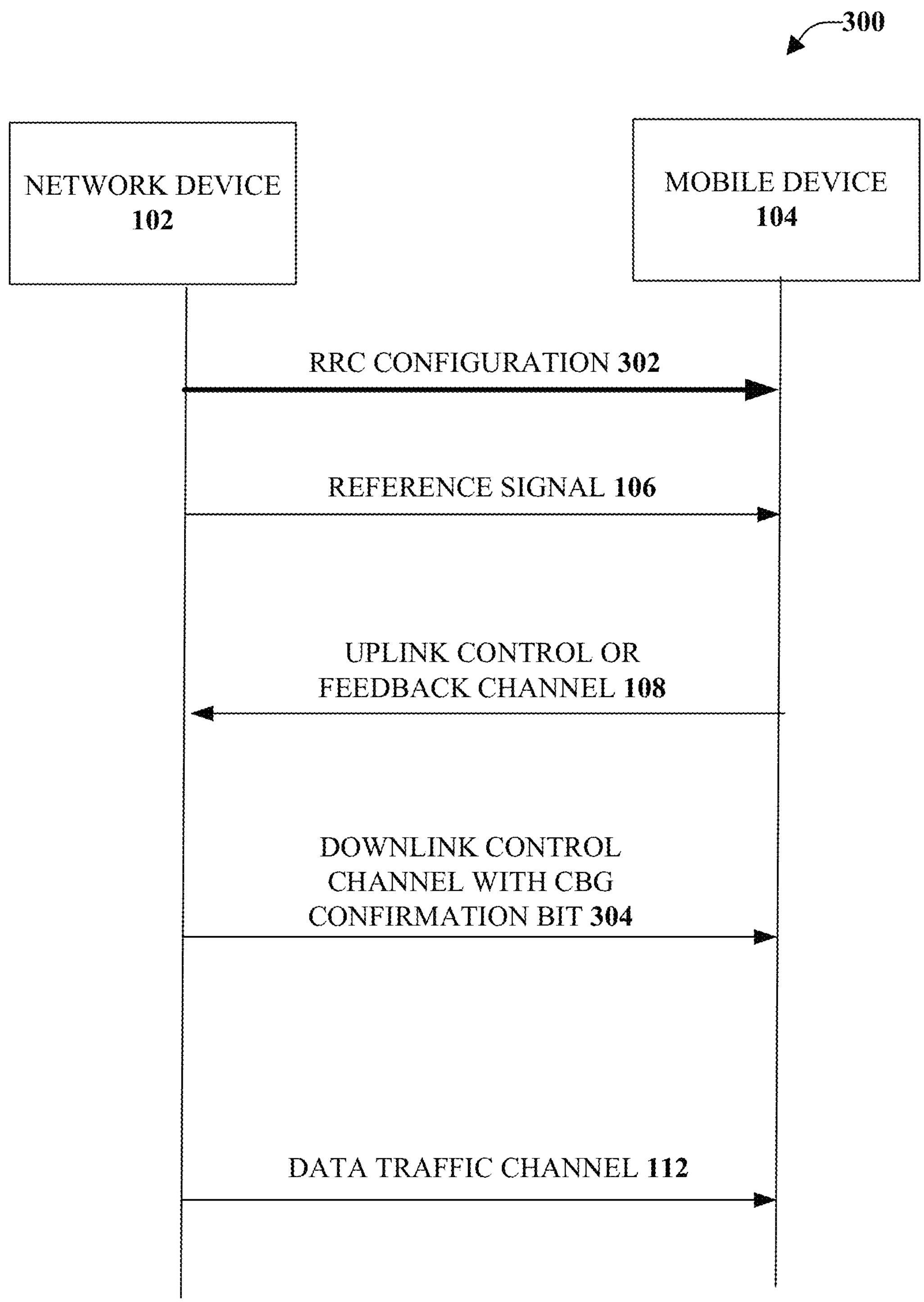
FIG. 3 illustrates an example, non-limiting, message sequence chart in accordance with one or more embodiments described herein.

FIG. 3 illustrates an example, non-limiting, message sequence chart 300 in accordance with one or more embodiments described herein. Repetitive description of like elements employed in other embodiments described herein is omitted for sake of brevity.

Initially, the network device 102 configures to mobile device 104 with a number or quantity of CBGs (N) per each codeword. For example, if the network supports up to 4 layer MIMO transmission, then one value of N for PDSCH transmission and one value of N for PUSCH transmission is utilized. However if the network supports up to 8 layer transmission, the network can indicate two values of N, which corresponds to respective codeword for PDSCH, and one value of N for PUSCH transmission. The network device 102 can send this information via RRC or higher layer signaling. In addition the network device 102 can enable CBG based re-transmission (via RRC signaling 302).

Upon or after the mobile device 104 sends the failed CBGs to the network via the uplink feedback channel 108, the network device 102 can transmit, via a downlink control channel, a CBG confirmation bit 304. For example, the network device 102 can use a CBG confirmation bit equal to one and send this information in the downlink control channel. For data transmission, the network sends only those CBGs which are NAK, as communicated by the mobile device 104.

Figure 4:
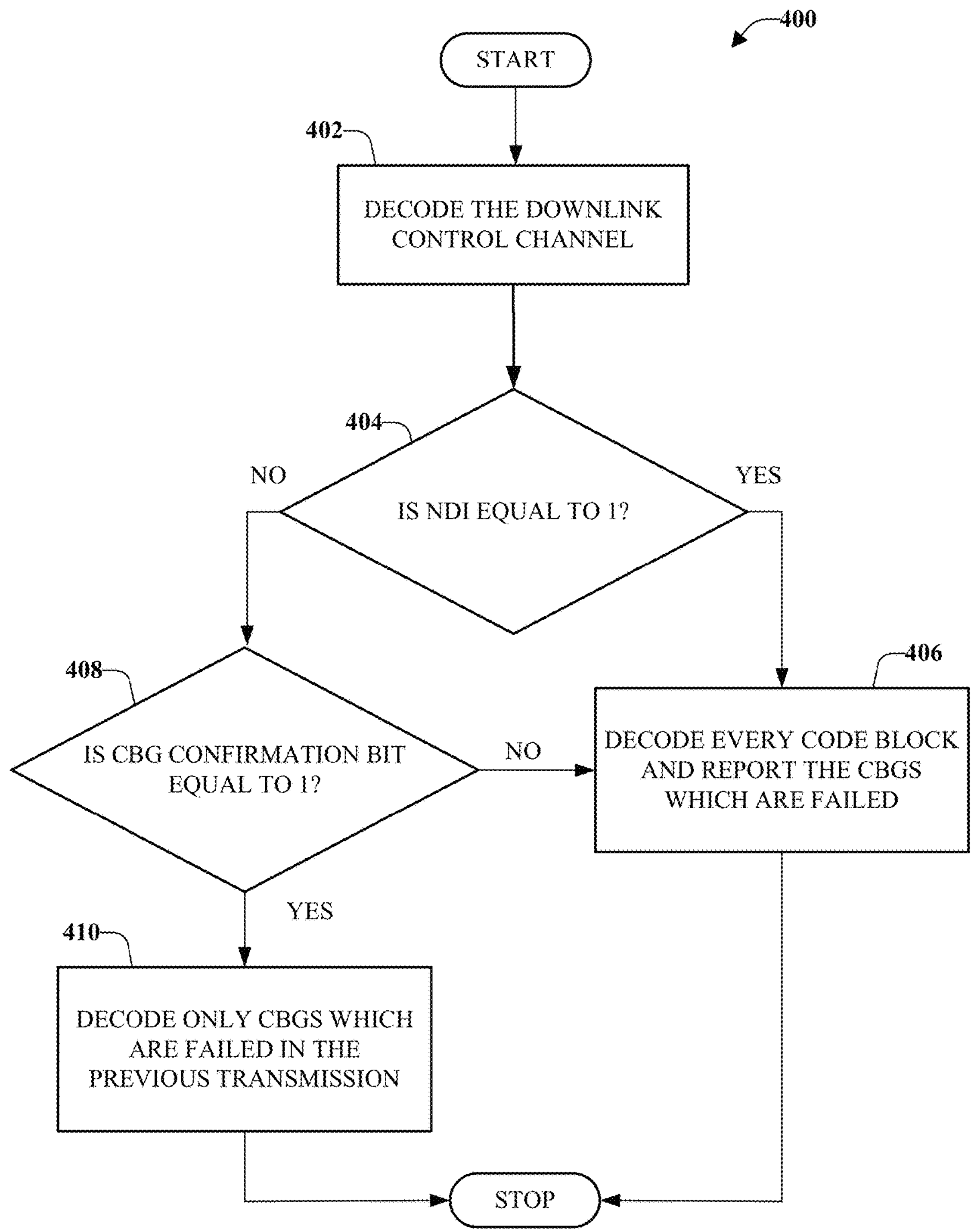
FIG. 4 illustrates an example, non-limiting flowchart for facilitating notifications to indicate failed code block groups in accordance with one or more embodiments described herein.

FIG. 4 illustrates an example, non-limiting flowchart 400 for facilitating notifications to indicate failed code block groups in accordance with one or more embodiments described herein. The cycle starts with decoding of the downlink control channel, at 402. A determination is made, at 406, whether a New Data Indicator (NDI) received comprises a value of “1.” If the NDI has a value of “1” (“YES”), at 406, the mobile device decodes every code block and reports the CBGs which are failed, if any, and the cycle stops.

Alternatively, if the determination is that the NDI does not have a value of “1” (“NO”), at 408, a determination is made whether the CBG confirmation bit comprise a value of “1.” The value of “1” indicates that the CBG is a re-transmission. Thus, if the value of the CBG confirmation bit is not “1” (“NO”), at 408, every code block is decoded and the CBGs which are failed, if any, are reported, and the cycle stops. If the value of the CBG confirmation bit is “1” (“YES”), at 410, only the CBGs which are filed in the previous transmission are decoded and the cycle stops.

Figure 5:
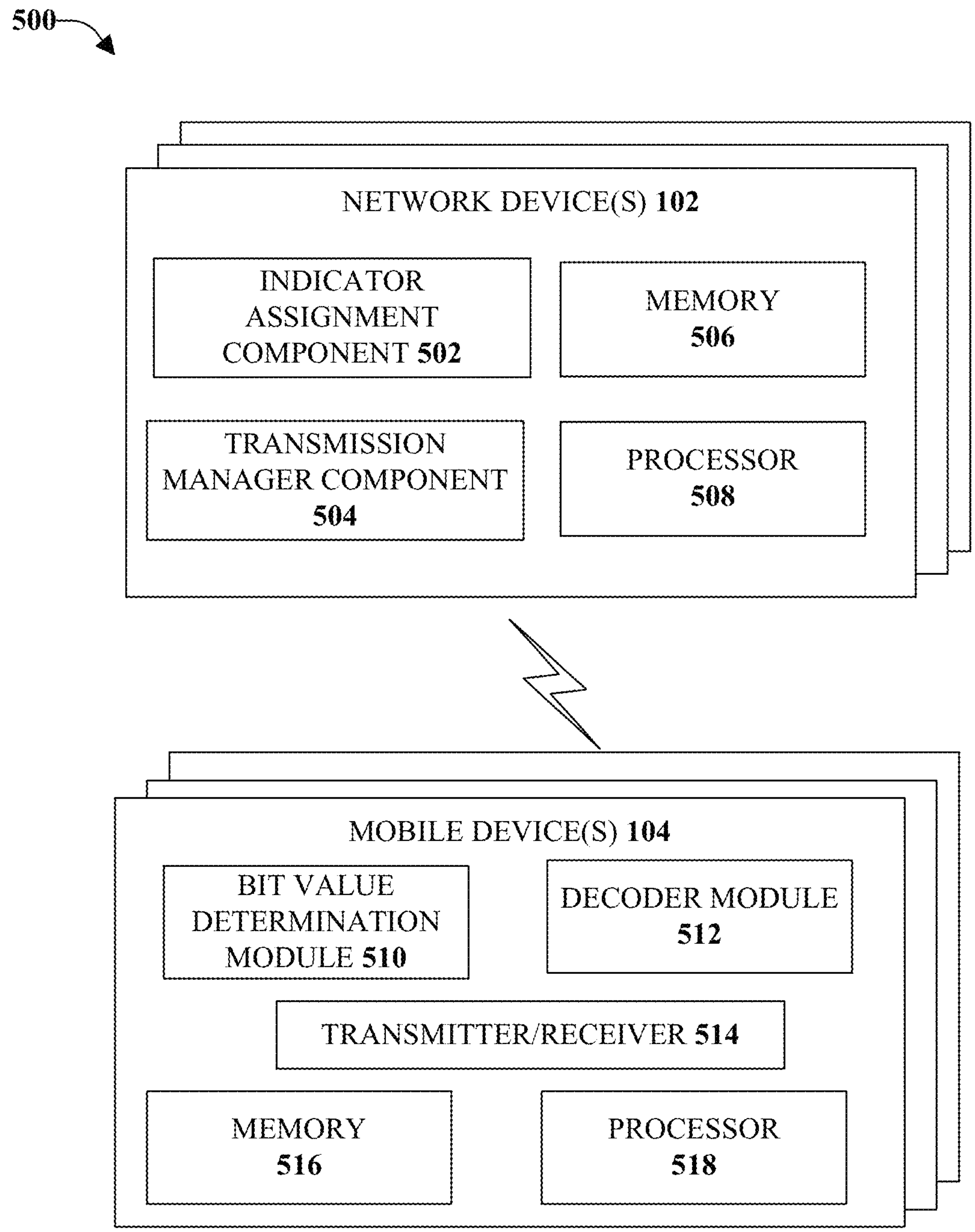
FIG. 5 illustrates an example, non-limiting, communications system for providing notifications to indicate failed code block groups in a wireless communications system in accordance with one or more embodiments described herein.

FIG. 5 illustrates an example, non-limiting, communications system 500 for providing notifications to indicate failed code block groups in a wireless communications system in accordance with one or more embodiments described herein. Repetitive description of like elements employed in other embodiments described herein is omitted for sake of brevity.

The communications system 500 can comprise one or more network devices (illustrated as the network device 102) and one or more user equipment or mobile devices (illustrated as the mobile device 104). The network device 102 can be included in a group of network devices of a wireless network. It is noted that although only a single mobile device and a single network device are illustrated, the communications system 500 can comprise a multitude of mobile devices and/or a multitude of network devices.

The network device 102 can comprise an indicator assignment component 502, a transmission manager component 504, at least one memory 506, and at least one processor 508. Further, the mobile device 104 can comprise a bit value determination module 510, a decoder module 512, a transmitter/receiver 514, a memory 516, and a processor 518.

The indicator assignment component 502 can set a single bit of information in a data stream to a defined value based on a receipt of a negative acknowledgement, from the mobile device 104, for a code block group after a first transmission of the code block group. For example, a first transmission can be sent from the network device 102 to the mobile device 104 and, based on an unsuccessful transmission of one or more code block groups in the first transmission, a NAK can be transmitted by the mobile device 104 (e.g., via the transmitter/receiver 514). For those code block groups for which the NAK was received, the indicator assignment component 502 can set the single bit of information (e.g., the CBG confirmation bit) to a value of "1."

Upon or after setting the value for the single bit, the transmission manager component 504 can facilitate a second transmission of the data stream via a control channel. The single bit of information that is set to the defined value indicates the code block group is being re-transmitted in the second transmission for a decoding at the mobile device 104.

The bit value determination module 510 can determine a value of the single bit of information. If the single bit is set to a value of "0," every code block received can be decoded by the decoder module 512. If any code blocks are not successfully decoded, the transmitter/receiver 514 can send a report indicating the code blocks that failed. Alternatively, if the single bit is set to a value of "1," a first group of code block groups of the code blocks group is decoded by the decoder module 512. The first group of code block groups can comprise code block groups that failed to be received by the mobile device during a previous transmission (e.g., the first transmission). A second group of code block groups of the code block groups that did not fail to be received by the mobile device during the previous transmission are not decoded.

The respective one or more memories 506, 516 can be operatively coupled to the respective one or more processors 508, 518. The respective one or more memories 506, 516 can store protocols associated with facilitating notifications to indicate failed code block groups as discussed herein. Further, the respective one or more memories 506, 516 can facilitate action to control communication between the network device 102 and the mobile device 104, such that the communications system 500 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 508, 518 can facilitate processing notifications that indicate failed code block group(s) in a communication network. The processors 508, 518 can be processors dedicated to analyzing and/or generating information received, processors that control one or more components of the communications system 500, and/or processors that both analyze and generate information received and control one or more components of the communications system 500.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes (e.g., network device 102) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 6:
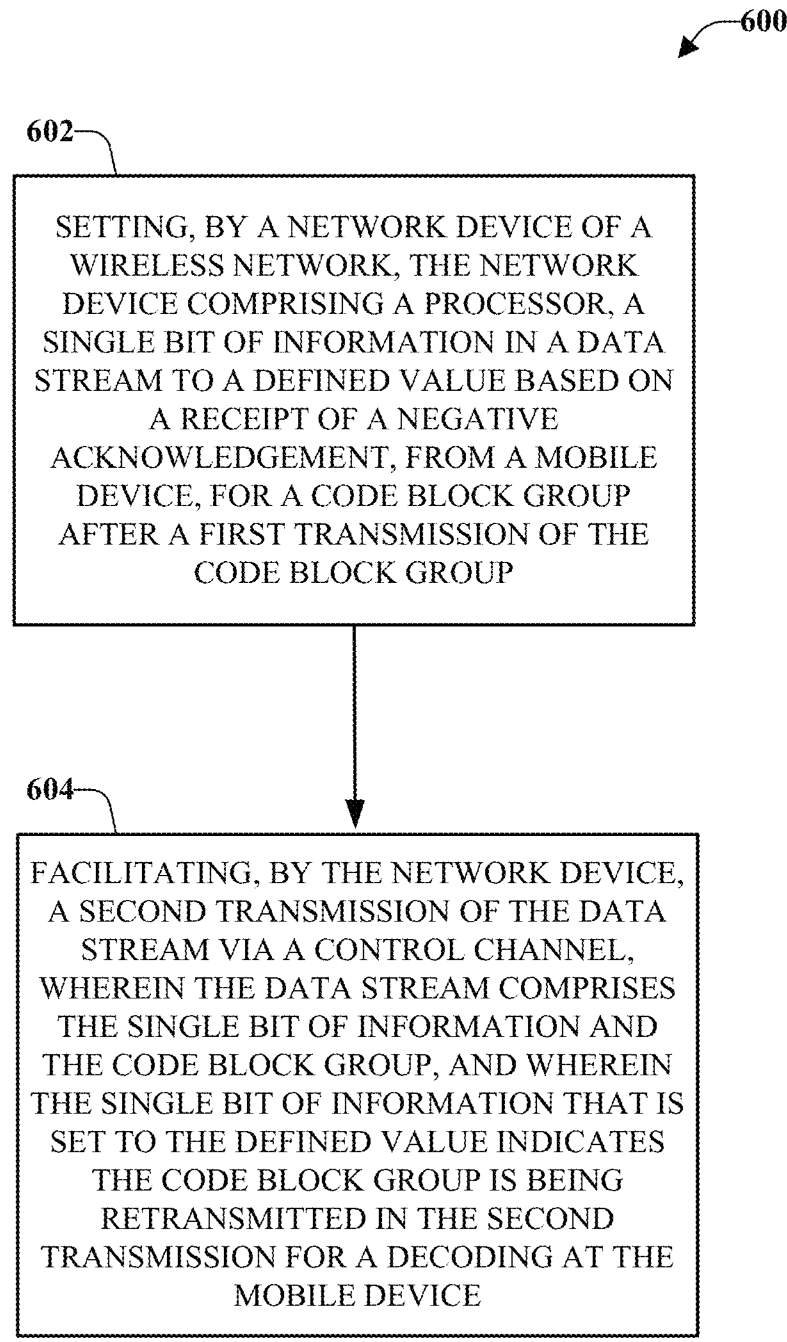
FIG. 6 illustrates an example, non-limiting, method for code block group notifications in accordance with one or more embodiments described herein.

FIG. 6 illustrates an example, non-limiting, method 600 for code block group notifications in accordance with one or more embodiments described herein. The method 600 can be implemented by a network device of a wireless network, the network device comprising a processor. Alternatively or additionally, a machine-readable storage medium can comprise executable instruction that, when executed by a processor, facilitate performance of operations for the method 600.

The method 600 starts at 602 when a single bit of information in a data stream is set to a defined value based on a receipt of a negative acknowledgement, from a mobile device, for a code block group after a first transmission of the code block group. By setting the single bit of information, the mobile device can determine whether or not a code block group should be decoded based on a previous decoding failure of the code block group.

At 604, a second transmission of the data stream via a control channel is facilitated. The data stream can comprise the single bit of information and the code block group. The single bit of information that is set to the defined value can indicate the code block group is being re-transmitted in the second transmission for a decoding at the mobile device.

According to some implementations, facilitating the second transmission can comprise using implicit signaling to indicate the defined value of the single bit of information. In some implementations, facilitating the second transmission can comprise facilitating the transmitting of the code block group using a hybrid automatic repeat request process identifier that was used for the first transmission. By setting the single bit of information as discussed herein, the method 600 can reduce a signaling overhead for a downlink control channel.

Figure 7:
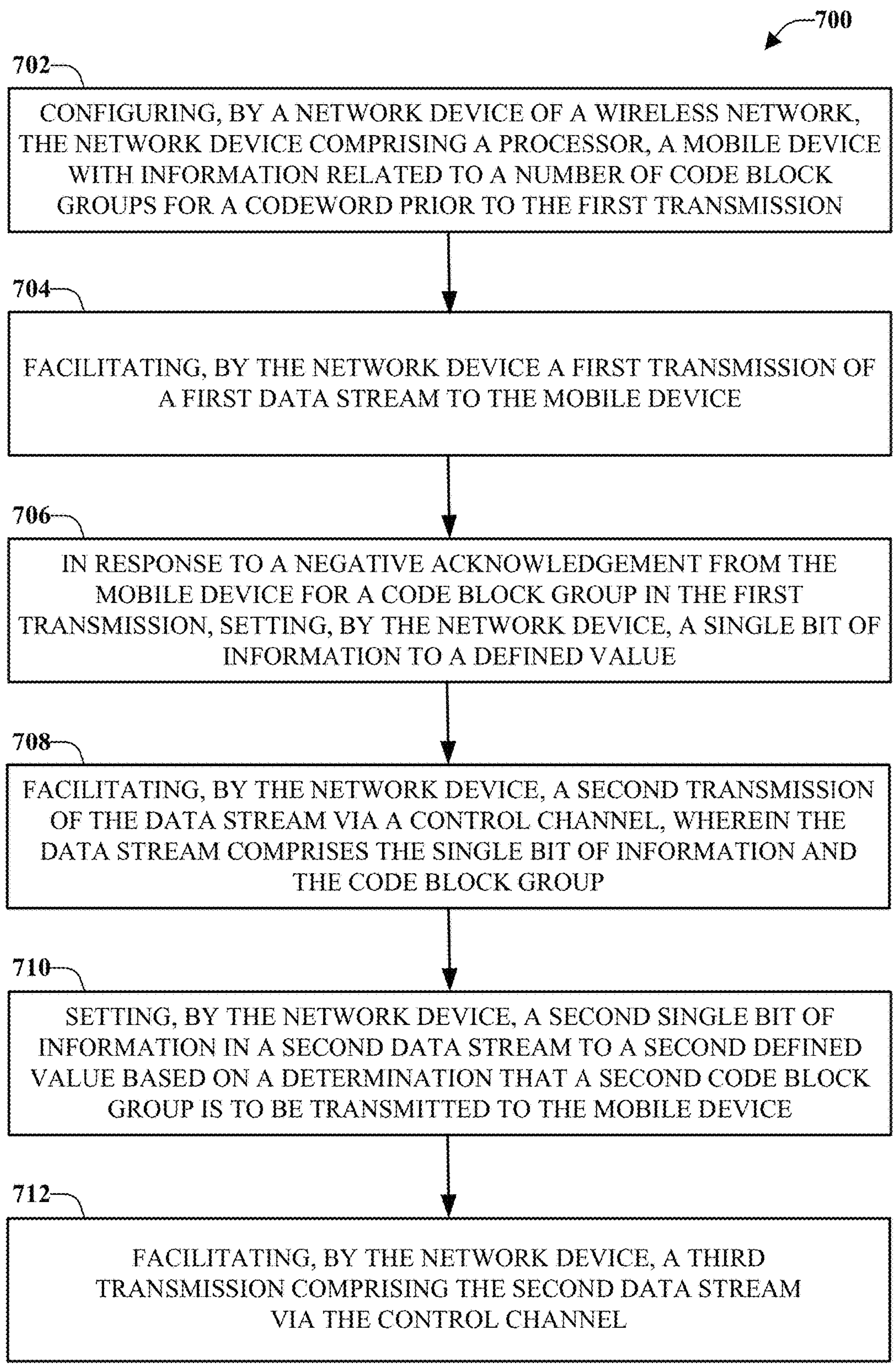
FIG. 7 illustrates an example, non-limiting, method for reducing a signaling overhead for a downlink control channel in accordance with one or more embodiments described herein.

FIG. 7 illustrates an example, non-limiting, method 700 for reducing a signaling overhead for a downlink control channel in accordance with one or more embodiments described herein. The method 700 can be implemented by a network device of a wireless network, the network device comprising a processor. Alternatively or additionally, a machine-readable storage medium can comprise executable instruction that, when executed by a processor, facilitate performance of operations for the method 700.

At 702, at least one mobile device can be configured with information related to a number of code block groups for a codeword. Further to this implementation, configuring the mobile device can comprise sending the sending the information via a radio resource control layer. Alternatively, configuring the mobile device can comprise sending the information via a signaling layer that is higher than a radio resource control layer. According to some implementations, the method can comprise enabling a control block group based re-transmission through radio resource control signaling.

Facilitation of a first transmission of a first data stream to the mobile device is performed, at 704. A CBG confirmation bit in the first data stream can be an arbitrary value since a CBG based transmission is meaningless for the first transmission.

In response to a negative acknowledgement from the mobile device for a code block group in the first transmission, at 706, a single bit of information (e.g., the CBG confirmation bit) is set to a defined value. In an example, the defined value can be a value of one. However, the disclosed aspects are not limited to this implementation and other values can be utilized. At 708, a second transmission of the data stream is facilitated via a control channel. The second transmission comprises the single bit of information and the code block group.

The method 700 can continue, at 710, with setting a second single bit of information in a second data stream to a second defined value based on a determination that a second code block group is to be transmitted to the mobile device. In an example, the first defined value can be a value of one and the second defined value can be a value of zero.

Further, at 710 the method can comprise facilitating a third transmission comprising the second data stream via the control channel. The second data stream can comprise the second single bit of information and the second code block group. The second defined value can indicate code block groups in the second code block group are to be decoded at the mobile device. Further, the second code block group was not previously transmitted to the mobile device. According to some implementations, facilitating the third transmission can comprise facilitating the third transmission using a hybrid automatic repeat request at a transport block level.

Figure 8:
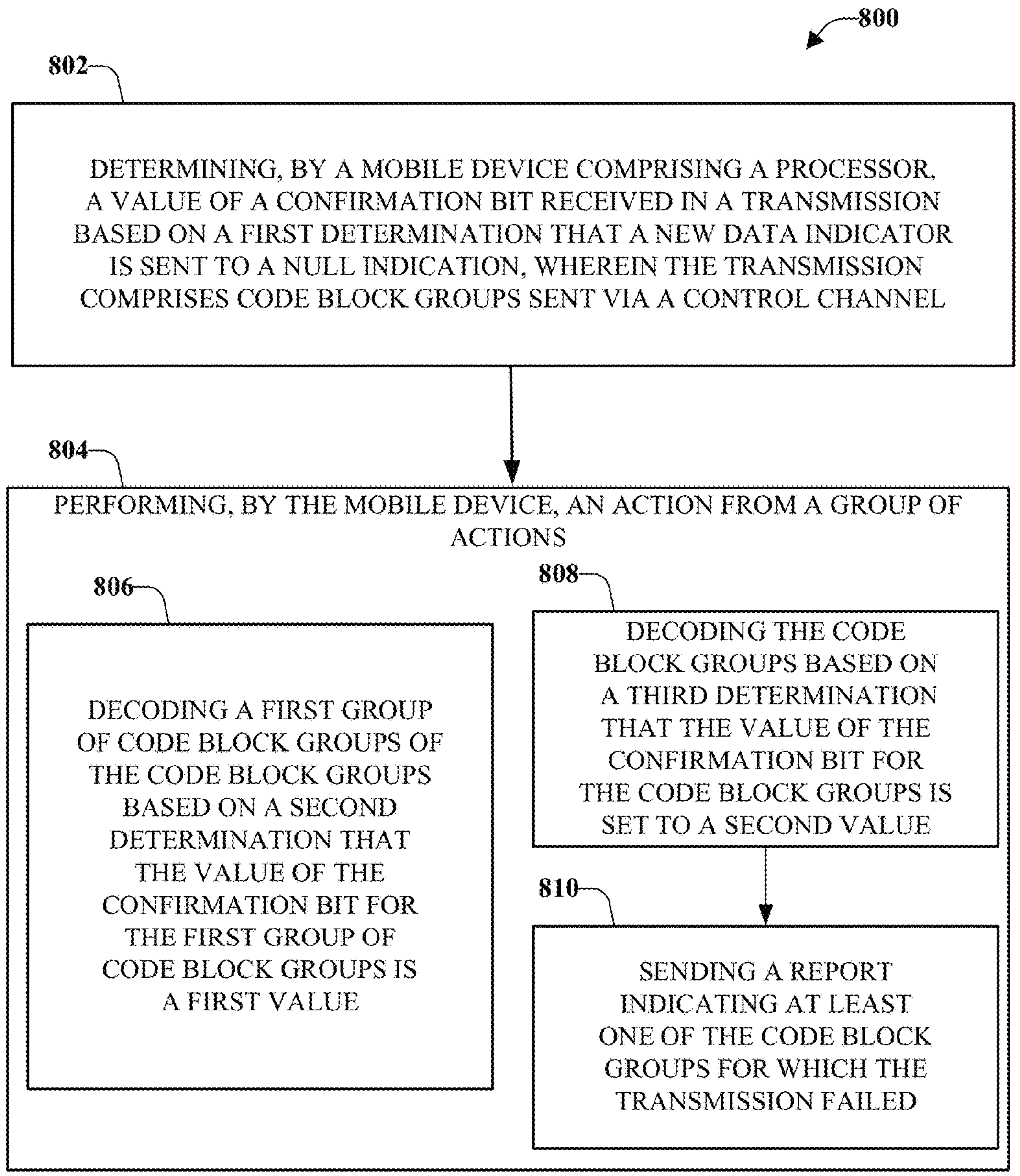
FIG. 8 illustrates an example, non-limiting, method for receiving a downlink control channel with reduced signaling overhead in accordance with one or more embodiments described herein.

FIG. 8 illustrates an example, non-limiting, method 800 for receiving a downlink control channel with a reduced signaling overhead in accordance with one or more embodiments described herein. The method 800 can be implemented by a mobile device comprising a processor. Alternatively or additionally, a machine-readable storage medium can comprise executable instruction that, when executed by a processor, facilitate performance of operations for the method 800.

The method 800 can comprise, at 802, determining a value of a confirmation bit received in a transmission based on a first determination that a new data indicator is set to a null indication. The transmission can comprise code block groups sent via a control channel. The control channel can comprise a downlink control channel configured to operate according to a fifth generation wireless communication network protocol. According to an implementation, determining the value of the confirmation bit can comprise determining the code block groups are received as a re-transmission based on the confirmation bit being the first value and determining the code block groups are a new transmission based on the confirmation bit being the second value. In an example, the first value can be one and the second value can be zero. However, the disclosed aspects are not limited to these values.

At 804, an action from a group of actions can be performed, which can be based on the value of the new data indicator. For example, an action can include, at 806, decoding a first group of code block groups of the code block groups based on a second determination that the value of the confirmation bit for the first group of code block groups is a first value. The first group of code block groups can be code block groups that failed to be received by the mobile device during a previous transmission. A second group of code block groups of the code block groups that did not fail to be received by the mobile device during the previous transmission are not decoded.

In an alternative implementation, the action can include, at 808, decoding the code block groups based on a third determination that the value of the confirmation bit for the code block groups is set to a second value. Further to this implementation, at 810, a report indicating at least one of the code block groups for which the transmission failed can be sent to the network device.

According to an implementation, the method can include receiving a configuration information that comprises information related to a quantity of code block groups for a codeword prior to receipt of the transmission. Receiving the configuration information can comprise receiving the configuration information via a radio resource control layer. Alternatively, receiving the configuration information can comprise receiving the configuration information via a signaling layer that is higher than a radio resource control layer.

The following will provide further details related to the various aspects discussed herein. For NR Access Technology, for grouping CB(s) into CBG(s), an implementation can be that with an indicated number of CBGs, the number of CBs in a CBG changes according to the Transport Block Set (TBS). In addition, for RANI, the following can be supported: For a given number of CBGs for a given TB, the number of CBs per CBG should be as uniform as possible. The difference of CB number per CBG between any two CBGs can be either 0 or 1.

CBG based transmission/re-transmission has been mainly focused on Ultra-Reliable Low latency Communications (URLLC) multiplexing with enhanced Mobile Broad Band (eMBB) data. However, the CBG based transmission/re-transmission is not only applicable to eMBB+URLLC, rather it can be viewed as tool to improve the performance of eMBB without any URLLC. CBG based transmission/re-transmission can be designed such that it provides flexibility to the systems design for improving the performance at the same time reduces the feedback channel overhead, as discussed herein.

The network can indicate the number of CBGs, where the number of CBs in a CBG changes according to the TBS. The procedure for indicating the number of CBGs in accordance with the various aspects disclosed herein will now be provided. To simplify the downlink and uplink feedback channel design, the network can configure the number of CBGs via RRC signaling.

According to an implementation, RRC signaling can be used to indicate the number of CBGs. In addition, the network can configure N on a per codeword level for PDSCH transmission. For example, for an UE capable of receiving 5-8 layer transmission, 2 codewords can be supported. The HARQ entity of each codeword is different, and the channel quality between these two codewords can differ significantly. Therefore, the number of CBGs per codeword level can be configured. Accordingly, the network can configure two values. For example, N1 can correspond to the first codeword and N2 can correspond to the second codeword for downlink transmission.

In a similar manner, for uplink PUSCH transmission, the number of CBGs can be different as compared to the number of CBGs configured for PDSCH. This is because the channel qualities can be different for downlink and uplink transmissions.

Thus, the network can indicate three values for configuring the number of CBGS. The first two values can correspond to PDSCH transmission of their respective codeword and the third value can correspond to the PUSCH transmission.

According to another implementation, the network can indicate three values for indicating the number of CBGs, where the first two correspond to the PDSCH transmission and the third one corresponds to the PUSCH transmission For example, the number of CBGs indicated by the network can be denoted as N. Thus, the value of N can be:

$$2 \leq N \leq \text{ceil}\left(\frac{TBS_{max}}{D}\right)$$

where the TBSmax is the maximum value of TBS per each codeword, D is the CB level granularity for CBG, and ceil is the ceiling functionality for any given real number. In an implementation, the value of D can be a fixed value. For example, the value of D can be equal to 8192 bits for achieving the maximum benefits of CBG based re-transmission. However for reducing the feedback channel overhead, D can be fixed to a higher value.

Thus, according to a further implementation, a minimum value for the number of CBGs can be equal to 2 and the maximum value for the number of CBGs can be equal to ceil(TBSmax/D), where D=8192 bits.

Another aspect of CBG based re-transmission is the grouping of CB(s) into CBG(s). A design option can include using sequential mapping for grouping CBs into a CBG. In this option, each CBG can be defined sequentially. For example, if there are 8 CBs and the network decided to configure 2 CBGs, then the CBG1 comprises CBs 1-4 and CBG 2 comprises CBs 5-8.

According to another option, a pre-defined mapping rule for grouping CB(s) into a CBG(s) can be utilized. In this option, a pre-defined rule can be used to group the CBs to form a CBG. The following examples uses the same example above where the network configures 2 CBGs. In accordance with this example, a rule can be defined where all the odd CBs corresponds to CBG1 and the all the even CBs are mapped to CBG2. Thus, CBG1 comprises CBs 1, 3, 5 and 7, and CBG2 comprises 2, 4, 6, and 8. In a similar manner, other rules can be defined for grouping CBs into CBG. The gains due to pre-defined mapping rule can be equal to the gains of a sequential mapping rule. Thus, a sequential mapping rule can be used for grouping CBs into CBGs.

The following discusses a DCI design for CBG based transmission. For a DL CBG-based re-transmission, the following information can be configured to be included in the same DCI: an indication of which CBG(s) is/are re-transmitted and another indication of which CBG(s) is/are handled differently for soft-buffer/HARQ combining. For the downlink control channel design with CBG based re-transmission, the network should inform which CBGs are re-transmitted. Various design options for conveying this information to the UE can be implemented.

According to an implementation, the information can be conveyed with explicit indication (e.g., Option 1). For example, the DCI can comprise a bit map that indicates (if configured) the number of CBGs which are re-transmitted for the current transmission. It is noted that in this case, the bit map length can be equal to that of the number of CBGs configured by the network.

According to another implementation, the information can be conveyed with explicit indication (e.g., Option 2). However, rather than explicitly indicating which CBGs are re-transmitted, the network can indicate through implicit signaling by a single bit, referred to herein as a CBG confirmation bit. When this bit is set to one the UE can determine that the network has re-transmitted the same CBGs which were reported as NAK by the UE for the previous DL transmission for the same HARQ process identifier. If the CBG confirmation bit is set to zero, then the UE can determine that the network is using TB level re-transmission rather than CBG level re-transmission.

With explicit indication, the signaling overhead for the DCI can be large. As an example, take the case for maximum transport block size (TBSmax), the number of possible CBGs (N) for a single codeword which is given by:

$$N = \text{ceil}\left(\frac{TBS_{max}}{D}\right)$$

where the TBSmax is the maximum value of TBS per each codeword, D is the CB level granularity for CBG, and ceil is the ceiling functionality for any given real number. The value of N is given by $$N = \text{ceil}\left(\frac{RE\text{max}X\,Txrank\,X\log2(M\text{max}) * ODFDM\text{max}}{D}\right)$$

where the REmax is the maximum number of resource elements, Txrank is the transmission rank for PDSCH, Mmax is the maximum modulation protocol (M-QAM) used for the codeword, and OFDMmax is the maximum number of OFDM symbols in a given transmission. It is noted that in the above equation, it is assumed the TB size increases in proportional to the number of layers, The table below illustrate the maximum number of CBGs as a function of a transmission rank when REmax is equal to 6600, Mmax is equal to 8 (256 QAM). The below table shows the maximum number of CBGS.

| Transmission rank | Number of CBGS (N) | | | |
|---|---|---|---|---|
| | D = 8192 bits | D = 16384 bits | D = 24576 bits | D = 32768 bits |
| 1 | 91 | 46 | 31 | 23 |
| 2 | 181 | 91 | 61 | 46 |
| 3 | 271 | 136 | 91 | 68 |
| 4 | 361 | 181 | 121 | 91 |

Thus, it can be observed that even the case where 1 CBG is equal to 4 CBs, the maximum number of CBGS is equal to 91. Hence with Option 1 above, where explicit signaling is used to indicate which CBGS are re-transmitted, the network can send a bit map length equal to 91. Thus, at least for PDSCH transmission, the network can avoid this overhead by using CBG confirmation bit in downlink control channel, as discussed herein.

In addition, this bit can be used to transition between TB level re-transmission and CBG based re-transmission. Therefore, instead of using explicit signaling to indicate the CBG re-transmission, the network can use the CBG confirmation bit for indicating the CBG re-transmission. Accordingly, the CBG confirmation can be used for each codeword in DCI to indicate which CBGs are re-transmitted for PDSCH.

The following will discuss CBG transmission procedures. In some implementations, CBG-based transmission with single/multi-bit HARQ-ACK feedback can have various characteristics including only allowing CBG based re-transmission for the same TB of a HARQ process. Another characteristic can be that the CBG can include all CB of a TB regardless of the size of the TB. In this case, the UE can report single HARQ ACK bits for the TB. Other characteristics can be that the CBG can include one CB and/or that the CBG granularity can be configurable.

Further, the UE can be semi-statically configured by RRC signaling to enable CBG-based re-transmission. The semi-static configuration to enable CBG-based re-transmission can be separate for DL and UL.

For grouping CB(s) into CBG(s), the following options can be considered. For a first option, with a configured number of CBGs, the number of CBs in a CBG can change according to TBS. According to a second option, with a configured number of CBs per CBG, the number of CBGs can change according to TBS. A third option can be that the number of CBGs and/or the number CBs per CBG can be defined according to TBS. For the CBG based transmission and re-transmission procedures, a fourth option can be that the CBG is approximately aligned with symbol(s)

Figure 9:
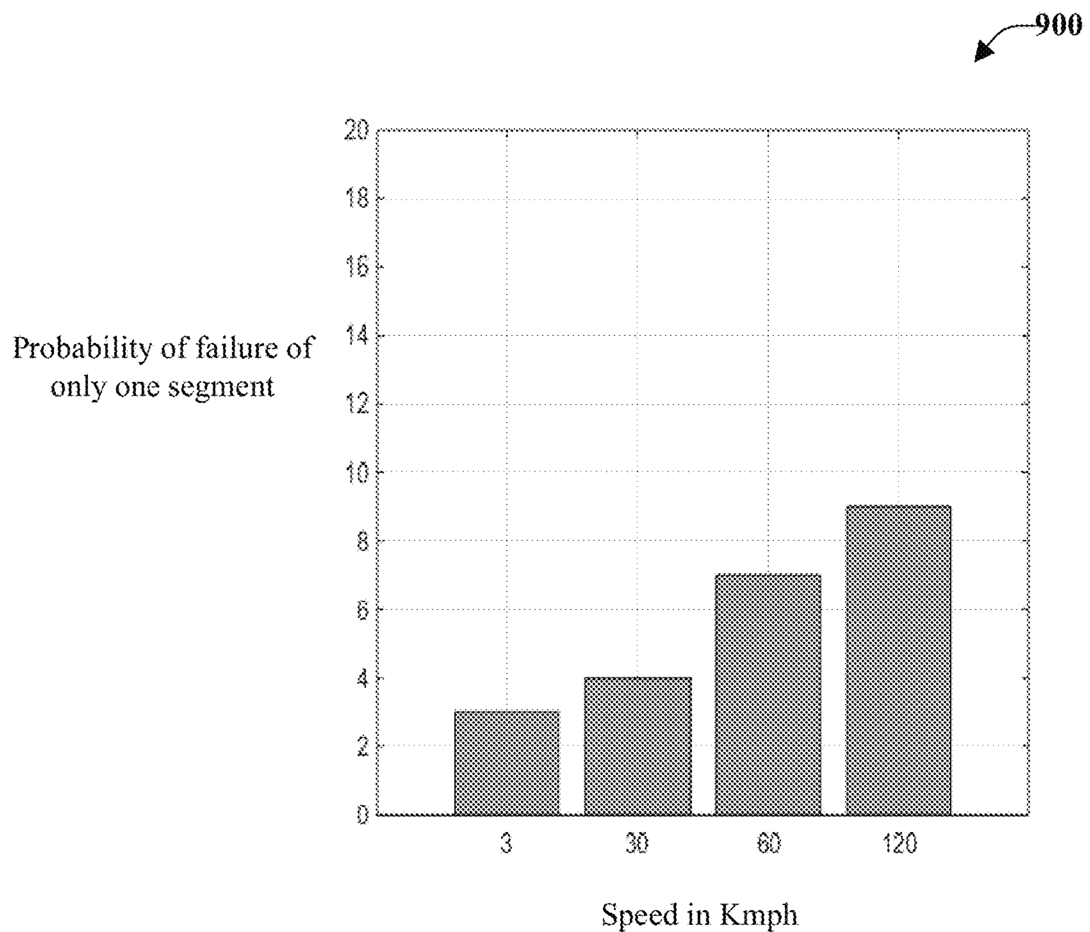
FIG. 9 illustrates an example, non-limiting, chart of the probabilty of failure of segments with Signal-to-Noise Ratio equal to 20 dB as a function of speed in accordance with one or more embodiments described herein.
Figure 10:
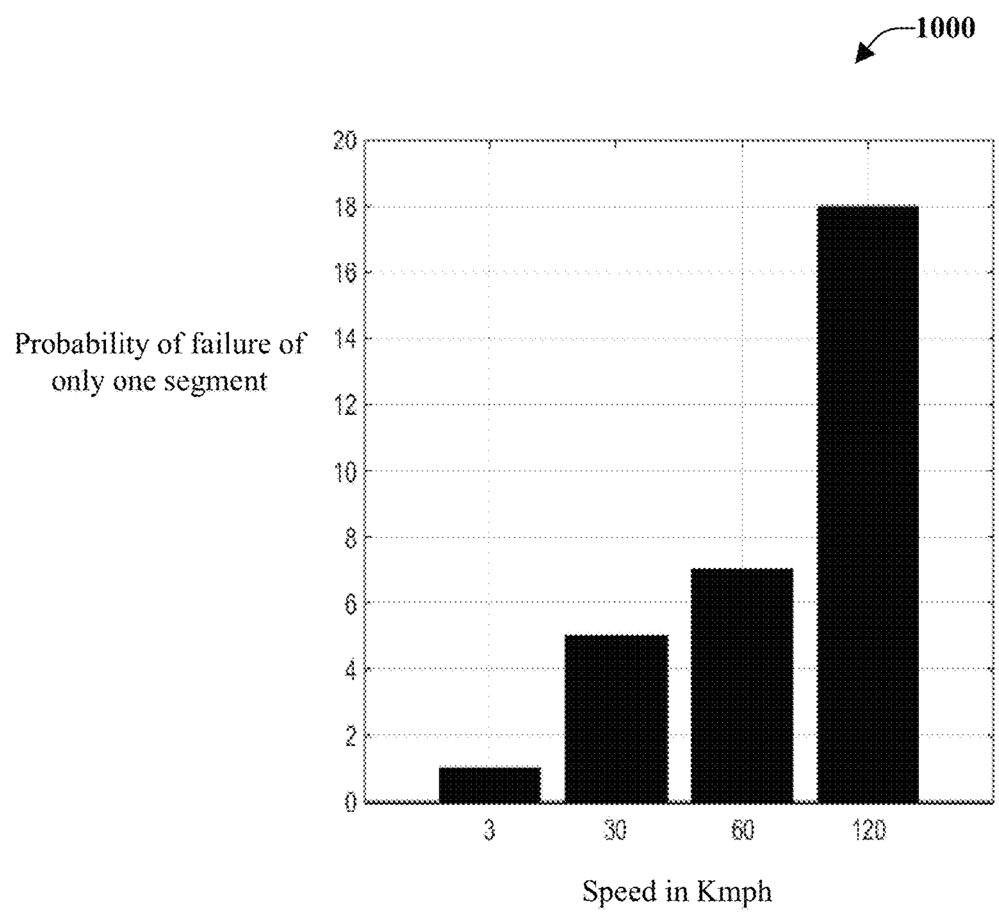
FIG. 10 illustrates an example, non-limiting, chart of the probabilty of failure of segments with Signal-to-Noise Ratio equal to 10 dB as a function of speed in accordance with one or more embodiments described herein.
Figure 11:
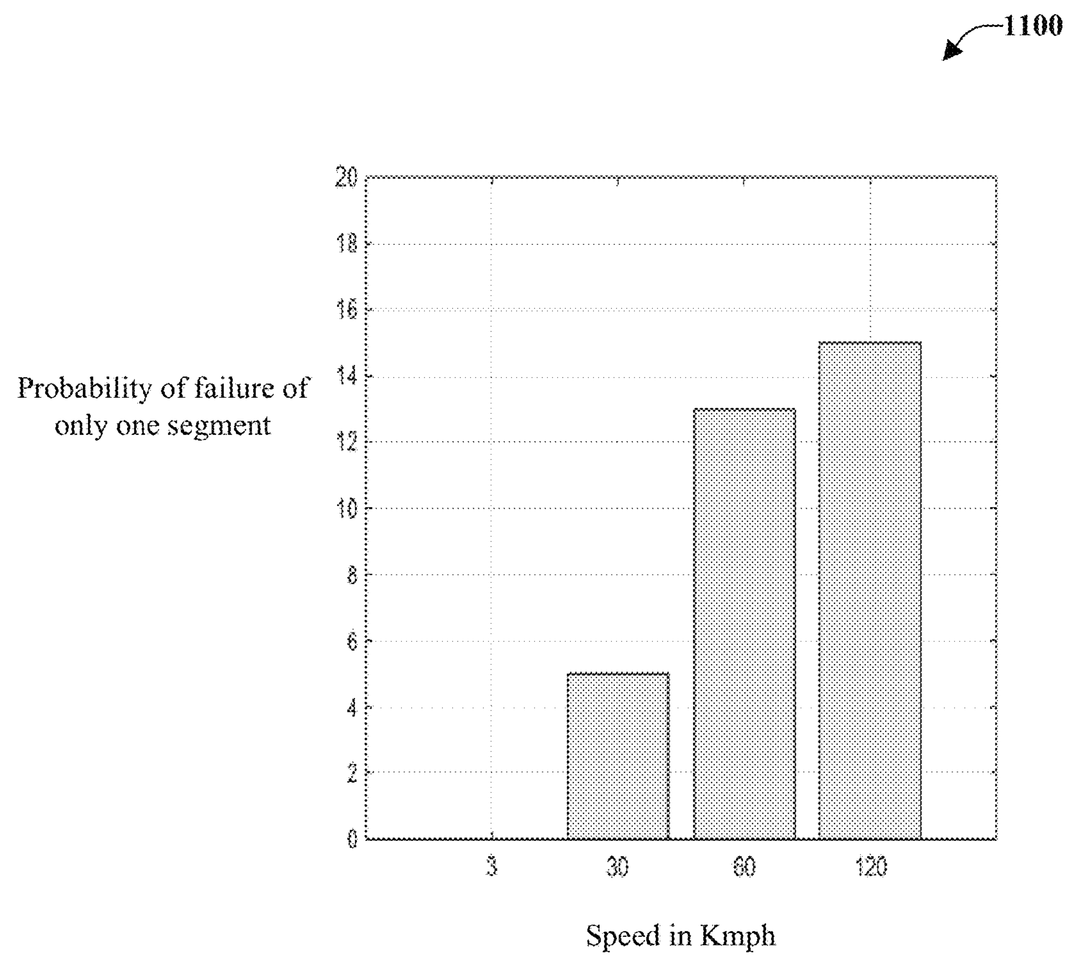
FIG. 11 illustrates an example, non-limiting, chart of the probabilty of failure of segments with Signal-to-Noise Ratio equal to 0 dB as a function of speed in accordance with one or more embodiments described herein.

CBG based transmission/re-transmission has been focused on URLLC multiplexing with eMBB data. However, CBG based transmission/re-transmission is not only applicable to eMBB+URLLC. Instead, CBG based transmission/re-transmission can be a tool to improve the performance of eMBB without any URLLC. CBG based transmission/re-transmission can be designed such that it provides flexibility to the systems design for improving the performance and, at the same time, reduces the feedback channel overhead. For example in eMBB systems, FIGS. 9, 10, and 11 illustrate the probability of failure of one codeblock segment while the remainer of the codeblock segments are passed at 4.5 GHz frequency at high, medium and low SNRs respectively for 4×4 MIMO system. Specifically, FIG. 9 illustrates an example, non-limiting, chart 900 of the probabilty of failure of only segments with Signal-to-Noise Ratio equal to 20 dB as a function of speed in accordance with one or more embodiments described herein. FIG. 10 illustrates an example, non-limiting, chart 1000 of the probabilty of failure of only segments with Signal-to-Noise Ratio equal to 10 dB as a function of speed in accordance with one or more embodiments described herein. FIG. 11 illustrates an example, non-limiting, chart 1100 of the probabilty of failure of only segments with Signal-to-Noise Ratio equal to 0 dB as a function of speed in accordance with one or more embodiments described herein.

Thus, it can be observed that there can be significant probabilities that only one segment is in error, while the remainder of the segments are passed at all SNRs. The probability of failure of only one segment increases with the speed at all geometries. Therefore, configuring the number of code blocks/CBGs can be based on UE channel conditions (small scale and large scale) and also the MIMO rank, and so on. For example, the number of code block segments within a transport block can increase with rank (due to single codeword structure). Thus, in these cases, CBG based transmission/re-transmission can be useful if the UE can feedback with small number of CB per CBG.

The number of code block segments in error depends on quality of link adaptation according to Option 3. With Option 2, the network can inform the number of CBs per CBG only. Note that the network should inform the number of CBs per CBG per each codeword. For example, for a two codeword MIMO system (for ranks 5-8), the number of CBs per each codeword can be configurable. In a similar manner, the number of CBG based transmission can separate for DL and UL. Therefore, the network might send a different number of CB(s) per CBG for UL.

Option 4 of CBG approximately aligned with symbol, is applicable for eMBB+URLLC multiplexing use case. In some cases, aligning with symbol might not occur since the alignment depends on the number of resource blocks scheduled to the UE.

For an uplink channel control design for CBG based re-transmission, the number of CBG HARQ ACK bits for a TB can be at least equal to the number of CBGs indicated or implied for transmission. The following will discuss the uplink feedback channel structure for indicating the HARQ-ACK for CBGs. In CBG based transmission, for indicating the HARQ-ACK, the number of CBG HARQ ACK bits for a transport block can be equal to the number of CBGs configured. As discussed, the RRC configuration can be used for indication of number of CBGs. Therefore, the number of HARQ ACK bits can be configured by RRC signalling.

With multi antenna CBG based transmission, the HARQ-ACK bits can be defined for one codeword if the transmission rank is less than 4 and when the UE is scheduled with two codewords for 5-8 layer transmission. Two sets of HARQ-ACK bits can be used for their respective codewords as codeword bundling can nullify the gains achieved with CBG based transmissions.

Based on this, at least two design options for uplink feedback channel design can be utilized. A first option can be a fixed structure for HARQ-ACK bits for CBGs. In this option, the number of HARQ-ACK bits can be equal to the number of CBGs configured. This option is simple and is a direct extension of HARQ-ACK for LTE for CBG.

Figure 12:
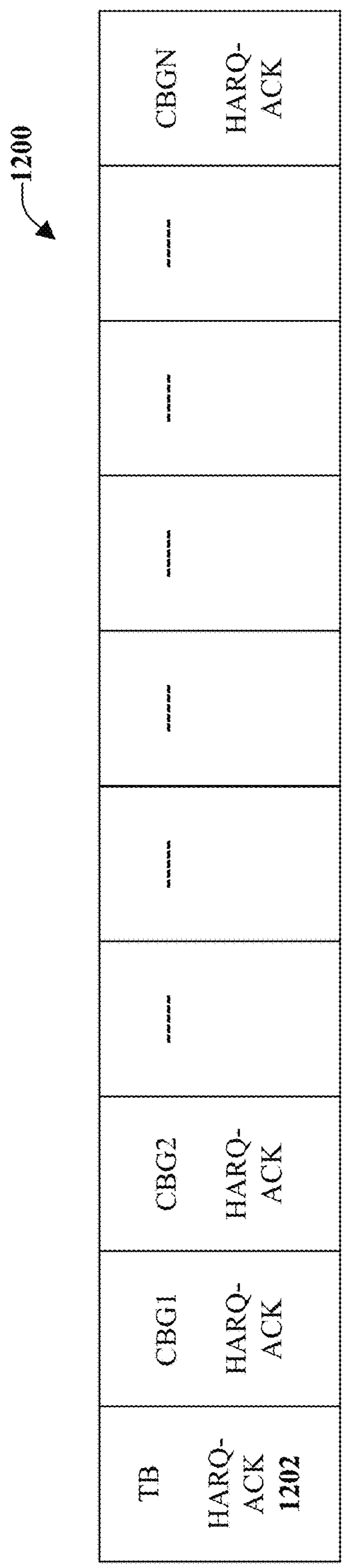
FIG. 12 illustrates an example, non-limiting adaptive HARQ-ACK structure in accordance with one or more embodiments provided herein.

A second option can be an adaptive structure of HARQ-ACK bits for CBGs: In this second option, instead of using a fixed number of HARQ-ACK bits for CBGs, an additional TB level HARQ-ACK bit can be utilized. For example, FIG. 12 illustrates an example, non-limiting adaptive HARQ-ACK structure 1200 in accordance with one or more embodiments provided herein. The HARQ-ACK structure 1200 can include a TB HARQ-ACK bit 1202, and one or more CBG HARQ-ACK bits.

It the network detects the TB HARQ-ACK bit 1202, which is an ACK in this example, the network can neglect (or ignore) the contents of the other HARQ-ACK bits for CBGs since the TB is already passed. On the other hand, if the network detects TB level HARQ-ACK and determines that the TB HARQ-ACK bit 1202 is a NAK, then the network can detect the CBG based HARQ-ACK bits to identify which CBGs are in error. In this manner, the signaling overhead for HARQ-ACK bits can be reduced when the number of CBGs configured are large. It is noted that the second option supports both TB level and CBG level HARQ-ACK and, at the same time reduces the signaling overhead.

As discussed herein, in code block group (CBG) re-transmission implementations, when the UE informs about the failed code block groups belonging to a specific HARQ process number via the uplink feedback channel, the network should re-transmit those failed code block groups during the next transmission. An approach for indicating the code block groups, which are scheduled for re-transmission, results in a very high signaling overhead. In an example, the network can configure the number of code block groups (N) for the highest number of resources elements, which can be 6600. Thus, N=6600*8*14*4/8192=90.2344. Accounting for rounding, the network can configure the N to be equal to 90. Therefore, for every re-transmission, the network needs to send a bit map of length equal to 90 bits in the downlink control channel. Where the bits positions corresponding to the failed code block groups are set to 1, which indicates to the UE that those CBGs are re-transmitted. Therefore, with the above noted approach for indicating the CBG during re-transmissions, a large amount of overhead is consumed for the downlink control channel. This implies that the downlink control channel occupies more resources, thereby reducing the number of resources available for data traffic channels. This in turn can reduce the throughput and capacity for the system. The various aspects discussed herein utilize a lower number of resources for downlink control channel and, at substantially the same time, can benefit from the CBG based transmission.

According to an embodiment, the failed code block groups can be indicated with significantly reduced overhead while at the same time achieving the gains due to the CBG based transmission techniques. A principle underlying the disclosed embodiments is that for re-transmissions, rather than explicitly indicating which CBGs are re-transmitted in the downlink control channel, the network can indicate through implicit signaling by a single bit (e.g., the CBG confirmation bit). When the CBG confirmation bit is set to one, the UE can determine that the network re-transmitted the same CBGs, which were reported as NAK by the UE for the previous DL transmission for the same HARQ process identifier. When the CBG confirmation bit is set to zero, the UE can determine that the network is not using CBG based re-transmission and is using conventional HARQ process at the transport block level (e.g., without the CBG concept). Therefore, as discussed herein, with the CBG confirmation bit, the signaling overhead can be significantly reduced. It is noted that during the first transmission (e.g., when the new data indicator is equal to 1), the contents of CBG confirmation bit is arbitrary since CBG based transmission is meaningless for the first transmission.

Further, according to the disclosed embodiments various advantages can be achieved. Such advantages include reduced signaling overhead for downlink control channel, thereby efficiently allocating the resources for control channel. Another advantage can be improving the link and system throughput. A further advantage can be reduced latency since the success probability increases with the one or more embodiments provided herein.

Described herein are systems, methods, articles of manufacture, and other embodiments or implementations that can facilitate management of group common downlink control channels in a 5G network. Facilitating of group common downlink control channels a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 13:
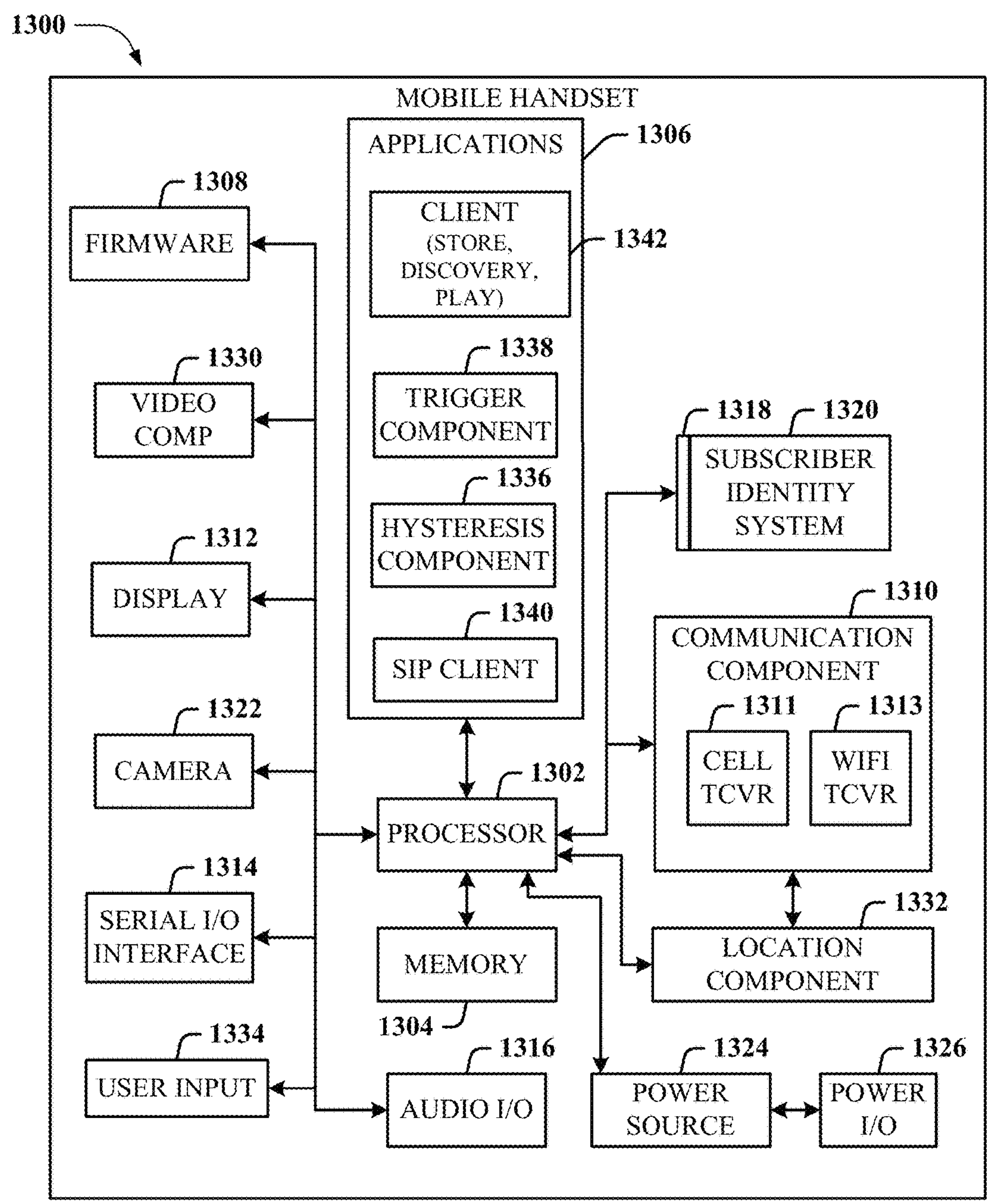
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1410 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VOIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
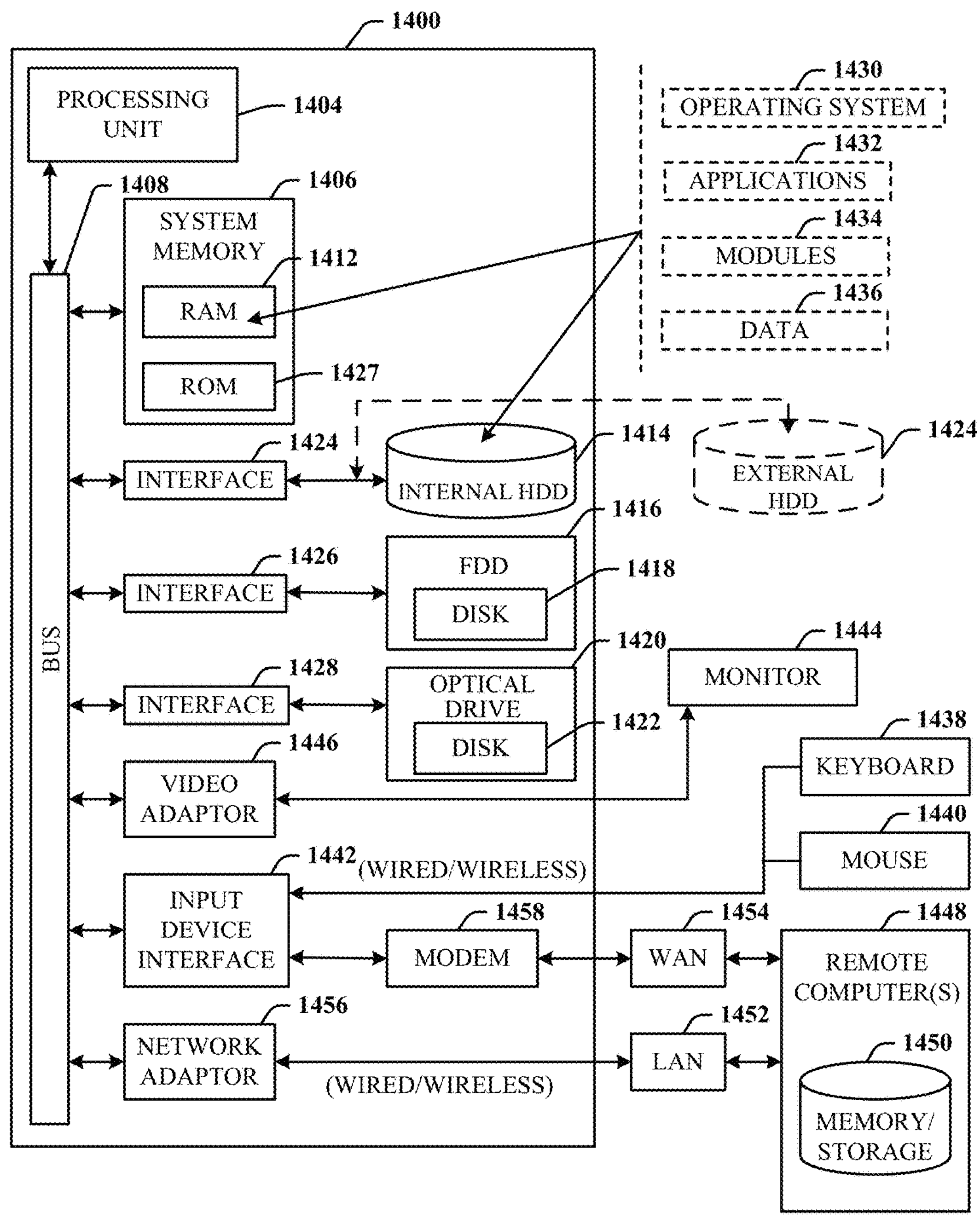
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

setting, by a network device of a wireless network, the network device comprising a processor, one bit of information in a data stream to a defined value based on a receipt of a negative acknowledgement, from a mobile device, for a code block group after a first transmission of the code block group;

facilitating, by the network device, a second transmission of the data stream via a control channel, wherein the data stream comprises the one bit of information and the code block group, and wherein the one bit of information that is set to the defined value indicates the code block group is being re-transmitted in the second transmission for a decoding at the mobile device; and sending, by the network device, configuration information that comprises information related to a quantity of code block groups for a codeword prior to the first transmission.

2. The method of claim 1, wherein the facilitating the second transmission comprises using implicit signaling to indicate the defined value of the one bit of information.

3. The method of claim 1, wherein the facilitating the second transmission comprises facilitating the transmitting of the code block group using a hybrid automatic repeat request process identifier that was used for the first transmission.

4. The method of claim 1, wherein the one bit of information is a first one bit of information, the data stream is a first data stream, the defined value is a first defined value, the code block group is a first code block group, and the method further comprises:

setting, by the network device, a second one bit of information in a second data stream to a second defined value based on a determination that a second code block group is to be transmitted to the mobile device; and facilitating, by the network device, a third transmission comprising the second data stream via the control channel, wherein the second data stream comprises the second one bit of information and the second code block group, and wherein the second defined value indicates code block groups in the second code block group are to be decoded at the mobile device, and wherein the second code block group was not previously transmitted to the mobile device.

5. The method of claim 4, wherein the first defined value is a value of one and the second defined value is a value of zero.

6. The method of claim 4, wherein the facilitating the third transmission comprises facilitating the third transmission using a hybrid automatic repeat request at a transport block level.

7. The method of claim 1, further comprises configuring, by the network device, the mobile device with information related to a number of code block groups for a codeword prior to the first transmission.

8. The method of claim 7, wherein the configuring the mobile device comprises sending the information via a radio resource control layer.

9. The method of claim 7, wherein the configuring the mobile device comprises sending the information via a signaling layer that is higher than a radio resource control layer.

10. The method of claim 1, further comprising enabling, by the network device, a control block group based re-transmission through radio resource control signaling.

11. The method of claim 1, wherein the setting of the one bit of information comprises reducing a signaling overhead for a downlink control channel.

12. A method, comprising:

determining, by a mobile device comprising a processor, a value of a confirmation data received in a transmission based on a first determination that a new data indicator is set to a null indication, wherein the transmission comprises code block groups sent via a control channel; and performing, by the mobile device, an action from a group of actions, the group of actions comprising:

decoding a first group of code block groups of the code block groups based on a second determination that the value of the confirmation data for the first group of code block groups is a first value, wherein the first group of code block groups are code block groups that failed to be received by the mobile device during a previous transmission, and wherein a second group of code block groups of the code block groups that did not fail to be received by the mobile device during the previous transmission are not decoded, and decoding the code block groups based on a third determination that the value of the confirmation data for the code block groups is set to a second value;

sending a report indicating at least one of the code block groups for which the transmission failed; and receiving configuration information that comprises information related to a quantity of code block groups for a codeword prior to receipt of the transmission.

13. The method of claim 12, wherein the determining the value of the confirmation data comprises:

determining the code block groups are received as a re-transmission based on the confirmation data being the first value; and determining the code block groups are a new transmission based on the confirmation data being the second value.

14. The method of claim 12, wherein the first value is one and the second value is zero.

15. The method of claim 12, wherein the receiving the configuration information comprises receiving the configuration information via a radio resource control layer.

16. The method of claim 12, wherein the receiving the configuration information comprises receiving the configuration information via a signaling layer that is higher than a radio resource control layer.

17. The method of claim 12, wherein the control channel comprises a downlink control channel configured to operate according to a fifth generation wireless communication network protocol.

18. A non-transitory machine-readable storage medium, comprising executable instructions that, when executed by a processor, facilitate performance of operations, comprising:

determining a value of at least one bit received in a downlink transmission based on a first determination that a new data indicator is set to a null indication, wherein the downlink transmission comprises code block groups sent via a control channel;

in response to a second determination indicating that the value of the at least one bit for a first code block groups of the code block groups is a first value, decoding first code block groups of the code block groups, wherein the first code block groups are code block groups that failed during a previous transmission, and wherein second code block groups that did not fail to be received by a mobile device during the previous transmission are not decoded;

in response to the second determination indicating that the value of the at least one bit for the first code block groups is not the first value, decoding the code block groups based on a third determination that the value of the at least one bit for the code block groups is set to a second value;

sending a report indicating a failed code block group of the code block groups for which the downlink transmission failed; and receiving configuration information that comprises information related to a quantity of code block groups for a codeword prior to receipt of the downlink transmission.

19. A non-transitory machine-readable storage medium of claim 18, wherein the control channel comprises a downlink control channel configured to operate according to a fifth generation wireless communication network protocol.

* * * * *